US006141319A

United States Patent [19]
Dighe et al.

[11] Patent Number: 6,141,319
[45] Date of Patent: *Oct. 31, 2000

[54] LINK BASED ALTERNATIVE ROUTING SCHEME FOR NETWORK RESTORATION UNDER FAILURE

[75] Inventors: Rajiv S. Dighe, Princeton Junction; Qiang Ren, Somerset; Bhaskar Sengupta, Cranbury, all of N.J.

[73] Assignee: NEC USA, Inc., Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/630,808

[22] Filed: Apr. 10, 1996

[51] Int. Cl.$^7$ ........................................ H04J 3/14
[52] U.S. Cl. .................... 370/218; 370/220; 370/221; 370/225
[58] Field of Search .................... 370/218, 219, 370/220, 225, 226, 228, 222, 217, 229, 237, 338, 351, 224, 381, 221, 400; 371/20.1

[56] References Cited

U.S. PATENT DOCUMENTS

| | | | |
|---|---|---|---|
| 4,956,835 | 9/1990 | Grover | 370/228 |
| 5,065,399 | 11/1991 | Hasegawa et al. | 370/228 |
| 5,146,452 | 9/1992 | Pekaroke | 370/228 |
| 5,235,599 | 8/1993 | Nishimura et al. | 370/218 |
| 5,345,444 | 9/1994 | Cloonan et al. | 370/381 |
| 5,548,639 | 8/1996 | Ogura et al. | 370/221 |
| 5,550,805 | 8/1996 | Takatori et al. | 370/222 |
| 5,592,466 | 1/1997 | Buczny et al. | 370/217 |

OTHER PUBLICATIONS

J. Anderson et al, "Fast restoration of ATM Networks," in IEEE Journal on Selected Areas in Communications, vol. 12, No. 1, Jan. 1994, pp. 128–138.

H. Sakauchi et al, "A Self-Healing Network With an Economical Spare-Channel Assignment," in Proc. from IEEE GLOBECOM '90, 1990, pp. 438–443.

W.D. Grover et al, "Near Optimal Spare Capacity Planning in a Mesh Restorable Network," in Proc. from IEEE GLOBECOM '91, 1991, pp. 2007–2012.

T. Cormen et al, Introduction to Algorithms, (The MIT Press, 1990), pp. 587–594.

E.M. Spiegel et al, "An Alternate Path Routing Scheme Supporting QOS and Fast Connection Setup in ATM Networks" in Proc. Of IEEE GLOBECOM '94, 1994.

Primary Examiner—Douglas W. Olms
Assistant Examiner—Schick Hom
Attorney, Agent, or Firm—Sughrue, Mion, Zinn, Macpeak & Seas, PLLC

[57] ABSTRACT

Alternative routing schemes in high-speed networks ensure fault tolerance in the event of a link failure. An heuristic algorithm, based on maximal-flow algorithm, is first used to partition the network into parts: one part carries regular or primary traffic and another part is reserved to carry re-routed traffic in the event of a link failure. The result of applying the algorithm is used to find alternative routes for a given call at the time of call setup. The scheme can be modified to accommodate hop-court limitations and loop avoidance.

1 Claim, 7 Drawing Sheets

Figure 1

PRIOR ART

Figure 2

PRIOR ART

|   | 5 | 6 | 7 | 6 | 7 | 6 | 4 |
|---|---|---|---|---|---|---|---|
| 5 | 8⁶ | 8⁷ | 8⁶ | 8⁷ | 8⁶ | 8⁸ | 6⁵ |
| 6 | 7⁸ | 8⁶ | 8⁸ | 8⁶ | 8⁸ | 6⁸ | 7⁶ |
| 6 | 7⁶ | 8⁸ | 7⁶ | 7⁸ | 8⁸ | 8⁶ | 8⁷ |
| 4 | 5⁸ | 6⁷ | 7⁶ | 7⁷ | 6⁶ | 7⁸ | 5⁵ |

LINK BASED ALTERNATIVE ROUTING SCHEME FOR NETWORK RESTORATION UNDER FAILURE

FIELD OF THE INVENTION

The present invention relates to alternative routing in high-speed networks to ensure fault tolerance. Specifically, the invention relates to an heuristic algorithm which optimizes the amount of primary capacity in a network while reserving sufficient capacity to restore all single-link failures, where the total capacity (primary and reserve) is fixed. The alternative routing for a given call is determined at the time of call setup.

BACKGROUND OF THE INVENTION

Currently used telecommunications networks are a combination of logically separated networks, comprising the public telephone network to carry voice and voice-band data and a variety of special services networks to carry various services such as corporate wide area networks or the Internet traffic. With the availability of very high speed fiber-optic links and techniques such as Asynchronous Transfer Mode (ATM), there is a migration towards integrating all of these networks into one Broadband ISDN network that is truly multi-class as well as multi-rate. A driving force for this integration is the ease of administering and maintaining the network. However, an integrated network must be considered in view of the current state of the art. Restoral around link failures is a particular area of concern. Presently, there is no attempt to restore a voice call around a failure; one simply is expected to re-dial. In the next-generation network, if a failure occurs during a multi-hour video call and the receiver is amenable to concealing small glitches, then the call could be restored as quickly as possible. Vital information (such as financial news feeds) was traditionally carried over special networks that were completely duplicated to minimize losses. Even this method fails if an entire central office is taken out of service.

If the traffic is to carried on a B-ISDN network, a very fast recovery from failures is essential. Another aspect of the next-generation network is the volume of information being transmitted on a single link where a single break can remove a large cross-section of the users from the network and a quick restoral is essential if the operating company is to maintain its reputation as a reliable service provider.

In present networks, restoral is a slow, time-consuming process done by a centralized restoral system. The control information for restoral is carried on a separate X.25 network to a centralized controller. If a link failure is noticed, information about the failure is first sent to the centralized controller. Then, the central controller runs an algorithm to restore the trunks on the failed link. This process typically is used for special services where the intent is not to restore lost data but rather to restore lost services as soon as possible. Restoral times on the order of a few hours is not unrealistic currently. However, a new approach, to restore traffic on a call-by-call basis, is necessary. This is the principal focus of the present invention, in which the problem of fault tolerance of high-speed networks is considered and a solution is provided where a distributed link-based alternative routing scheme guarantees that the network will survive under any single link failure. A principal object of the solution is to achieve network survival with very little restoral delay.

SUMMARY OF THE INVENTION

Previously, call-by-call alternative routing schemes have fallen into two categories, either (a) source-based or (b) link-based. In source-based routing schemes, the source takes on the responsibility of setting up two independent routes to the destination. These two routes must not have any common links, otherwise they will not satisfy the condition of survivability in the presence of any single link failure. Both route choices are made centrally by the source for each call. In the link-based alternative routing scheme proposed in the present invention, the primary route is chosen by the source, as was done heretofore. However, each link in the primary route must choose an alternative route that will be used in the event that the particular link fails. Hence, the process of choosing alternative routes is now distributed. The invention comprises a hierarchical decomposition of the problem into two sub-problems:

First, the overall network is divided into two virtual networks, each with its own capacity. The first virtual network carries the primary traffic and the second virtual network carries the re-routed traffic in the event of failure of a particular link in the first virtual network. The sum of the capacities of the two virtual networks equals the capacity of the original overall network. In dividing the network, the criterion is to maximize the overall primary capacity, subject to the condition that there is sufficient secondary or reserve capacity available so that the network survives any single link failure. The rationale is that having too much primary capacity may violate the survivability constraint and having too much secondary capacity may reduce the amount of carried traffic (and the revenue for the carrier) using the primary capacity. This optimization problem needs to be solved infrequently, only when topological or capacity changes take place in the network. The optimization problem can be cast as a linear optimization problem. However, since the number of variables required to solve the problem is prohibitively large, the present invention relies on a very fast heuristic to solve the problem.

Second is the problem of call level routing. When a call is actually in the process of being setup, each link in its primary route must choose an alternative route to be used in the event of failure of that link. This process is achieved by using the results of the first sub-problem. Additional considerations such as placing a limitation on the number of hops for the alternative route and loop avoidance can also be considered in solving the second sub-problem.

In the last few years, some alternative routing strategies for network restoration have been proposed and studied. For example, Anderson et al. in an article entitled "Fast Restoration of ATM Networks" in the IEEE Journal of Selected Areas in Communications, vol. 12, no. 1, pp. 128 to 138, 1994 propose three alternative routing schemes which are link-based, source-based and a hybrid of both. They performed a simulation for these schemes under different scenarios and examined the tradeoff among these different schemes in terms of spare capacity assignments, restoration and processing times. Sakauchi et al. in an article entitled "A Self-healing Network with an Economical Space-channel Assignment" in IEEE GLOBECOM '90, pp. 438–443, 1990 find a near optimal spare-capacity assignment for a network to restore itself under a single link failure for a link-based alternative routing scheme. Their algorithm is based on a linear program and the spare-capacity assignment is found under the assumption that the primary capacities (which carry regular traffic) are fixed and known. Their method then finds the spare capacity needed for this known primary capacity. With the same goal in mind, Grover et al. in an article entitled "Near Optimal Spare Capacity Planning in a Mesh Restorable Network," in GLOBECOM '91, pp. 2007–2012, 1991 develop a heuristic spare link placement algorithm to find a near optimal spare-capacity assignment rather than using the linear programming method. These methods are fundamentally different from the present invention where in the present invention it is assumed that the total capacity is known and fixed and has to apportioned between the primary and secondary traffic.

In summary, the prior art optimizes alternative routing based on the amount of secondary capacity needed for a given primary capacity with the goal of restoring any single link failure in the network. In contrast, the present invention optimizes the amount of primary capacity while leaving sufficient capacity to restore all single link failures given that the total capacity (primary plus secondary) is fixed. The proposed solution is more realistic for ATM networks where all the bandwidth is logically partitioned and there is no concept of working links and open links as is true in the presently used circuit-switched network. The present invention further uses near-optimal bandwidth assignment results to find alternative routes for given calls at the time of call setup.

A primary object of the invention is the provision of a heuristic technique which results in a static allocation at the end of an algorithm that provides both the amount of primary capacity on each link and the amount of secondary capacity needed for restoring traffic on each primary link.

A further object of the invention is the provision of a procedure which provides the total primary capacity on a link and also provides a set of alternative routes (which use secondary capacities on other links) to restore traffic in the event of a link failure.

A still further object of the invention is the provision of a completely distributed real-time algorithm for assigning alternative paths for a given call in the event of any single link on the primary path failing.

Another object of the invention is the provision of a very fast efficient restoral scheme where traffic on a given link can be restored on a cell-by-cell basis as the switch knows the alternative port for each call on a given port.

A still another object of the invention is the provision of using additional constraints to arrive at the initial capacity assignment problem, such as hop-limited and loop avoidance alternative routes.

Further and still other objects of the present invention will become more clearly apparent when the following description is read in conjunction with the accompanying drawing.

DETAILED DESCRIPTION OF THE INVENTION

Figure 1:
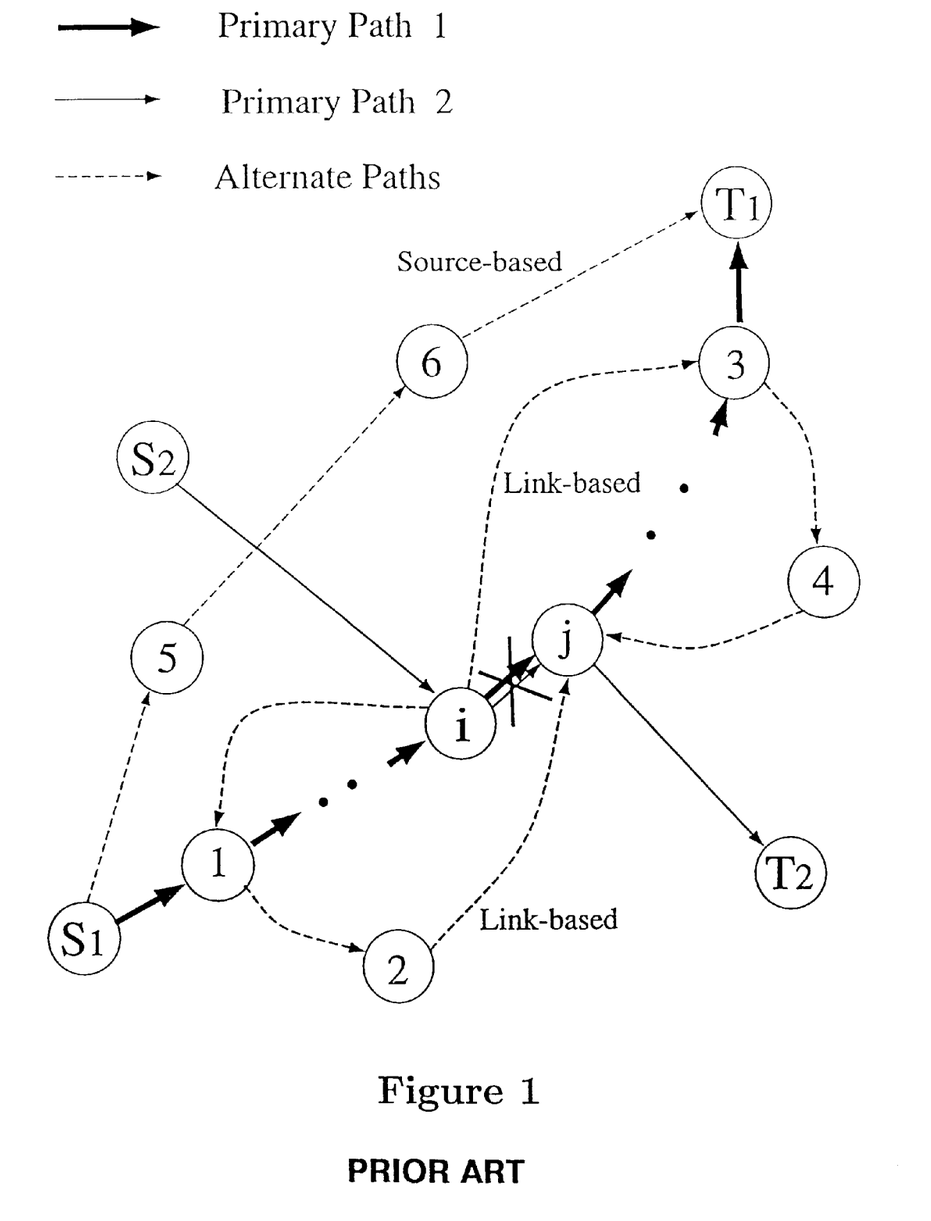
FIG. 1 is a graphical representation of a link based and source based re-routing scheme.

As stated above, the alternative routing schemes in network restoration generally fall into two broad categories: link-based and source-based. In link-based schemes, the nodes connecting the failed link have the task of finding and setting up an alternative route in the event of failure of that link. For example, as shown in FIG. 1, when link (i,j) fails, traffic on link (i,j) from both $S_1$ and $S_2$ are re-routed by using either of the two alternative routes i-1-2-j or i-3-4-j. The source-based alternative routes are chosen by the source node of the call and must have the property that the alternative route and primary route do not share any common link. For example, in FIG. 1, when link (i,j) fails, primary route 1 will use alternative route $S_1$-5-6-$T_1$ to re-route traffic to destination $T_1$.

The two kinds of alternative routing schemes have somewhat different characteristics. The link-based routing schemes are distributed since all re-routing decisions are made locally. The disadvantage of link-based schemes is that the underlying alternative routes may include some wasteful loops. For example, in FIG. 1, both alternative routes i-1-2-j and i-3-4-j for link (i,j) intersect primary route 1, causing two loops 1-i-1 and 3-4-j-3, although there are no loops for primary route 2. Initially, it may seem that these loops should be avoided. However, these routes do not cause any network deadlocks. They only cause a possible lower utilization of network resources when failure actually occurs (which is not a frequent event). The source-based routing schemes can easily avoid this kind of wasteful loop because the source is making the decisions about the primary as well as the secondary route. But this has it sown disadvantages. When failure actually occurs, the node connecting the failed link must send a report about the failure to the source node of every virtual circuit (VC) using that link, so that the alternative routes can be used. The result is that each node is required to store all the information about the routes used by all the VCs and that the data organization of the VC numbers must enable quick retrieval of only those VCs which are using a particular outgoing port. Finally (perhaps the most important reason), since this method introduces delays before the alternative routes can be used, the higher level protocols would have to do considerably more work to recover the packets lost during this delay. This drawback can be avoided by the link-based scheme provided by the present invention.

Figure 2:
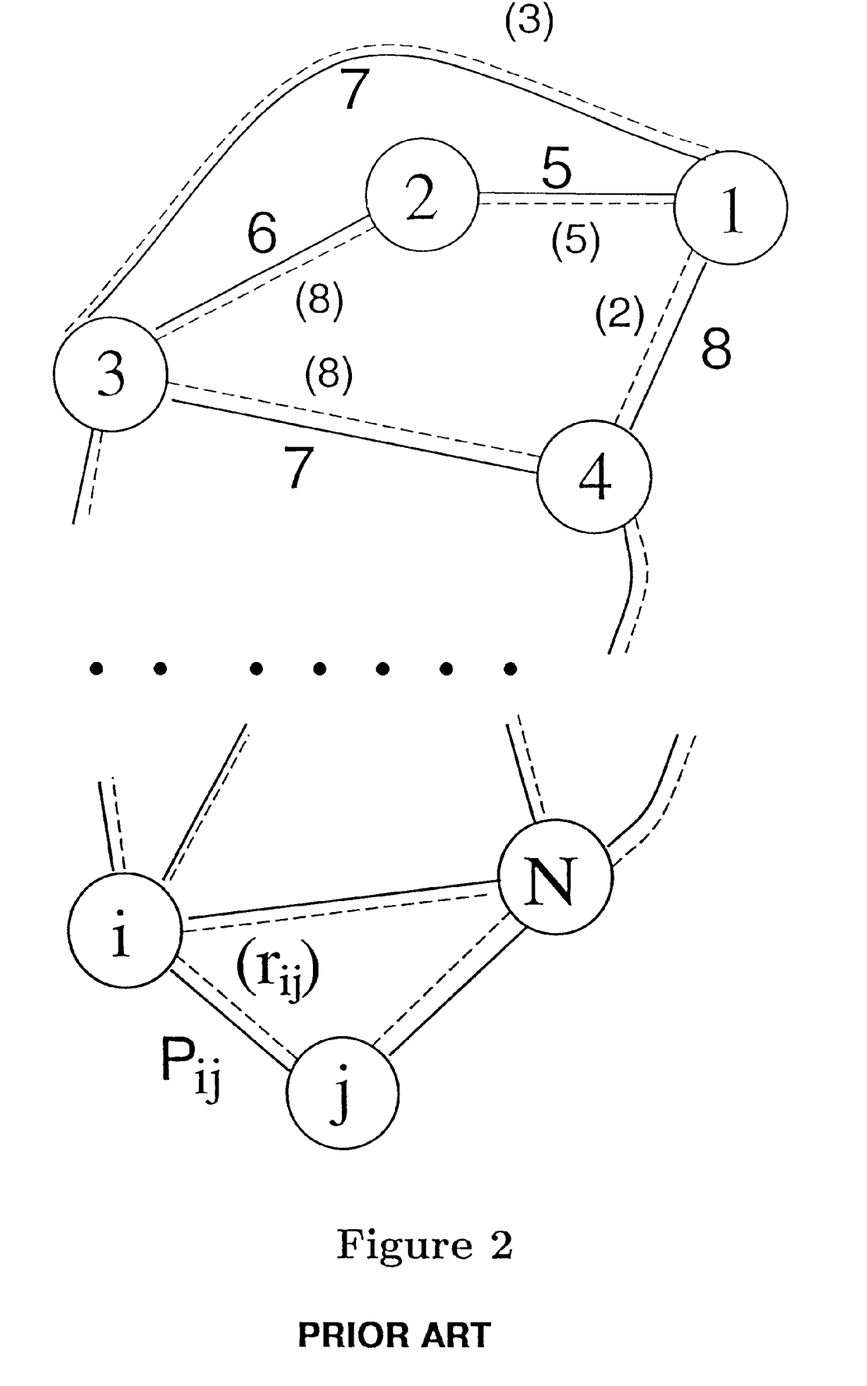
FIG. 2 is a graphical representation of primary and reserved capacity assignment in a network.

In any fault-tolerant network, the link capacities may not be solely used for primary traffic since some of these capacities would be used to carry the traffic on the alternative routes. Therefore, some link capacities must be reserved in order to carry the additional traffic when a link failure occurs. The total capacity of any link is divided into two parts: the primary capacity and the reserved capacity. The primary capacity is used for carrying primary traffic and the reserved capacity is used for carrying re-routed traffic during a failure. For example, in FIG. 2, the 10 units of capacity on link (1,2) cannot be solely used to carry primary traffic. In FIG. 2, the reserved capacity is shown in parenthesis. In this example, 5 units are reserved in case some link fails and needs to use link (1,2) as an alternative route. In this example, if link (1,4) fails, 5 units of primary traffic on link (1,4) could be re-routed through 1-2-3-4 while the remaining 3 units of primary traffic on link (1,4) could be re-routed through 1-3-4.

Having described conventional alternative routing schemes, it is now necessary to describe the problem in terms of a linear optimization problem. Consider a general network of N nodes, connected by links (i,j), i,j=1,2, . . . , N. The capacity of link (i,j) is $C_{ij}$. If node i and node j are not directly connected, set $C_{ij}$=0. Thus, the network can be represented by an undirected graph G=(V,E), where V is the set of N nodes and E consists of all the links (i,j) with capacity $C_{ij}$, i,j=1,2, ..., N. As used herein, a "route" from node i to node j is a sequenced set of connected links which originate at node i and terminate at node j. Denote the primary capacity (i.e., carrying regular traffic) on link (i,j) by $p_{ij}$ and the reserved capacity on link (i,j) by $r_{ij}$ as shown in FIG. 2. It follows that $$p_{ij}+r_{ij} \leq C_{ij}, \quad i,j=1,2, \ldots, N. \tag{1}$$

The goal is to optimize the network utilization while guaranteeing its restoration under any single link failure. Thus, it is necessary to maximize overall primary network capacity, $\Sigma_{ij} p_{ij}$, while ensuring that the primary traffic $p_{ij}$ for any link (i,j), i,j=1,2, ..., N can be re-routed through the reduced network (V,E−(i,j)).

Assume that link (i,j) has failed. Then the traffic carried on link (i,j) before the failure has to be carried through the alternative routes after the failure. A part of this re-routed traffic will be carried on link (a,b) and let us denote this part by $f_{ab}^{(i,j)}$. From this definition, $\Sigma_k f_{ik}^{(i,j)}$ represents the total amount of primary traffic carried by link (i,j), i.e., $p_{ij} = \Sigma_k f_{ik}^{(i,j)}$. This means that $\Sigma_{i,j} p_{ij} = \Sigma_{i,j} \Sigma_k f_{ik}^{(i,j)}$ and the objective function expressed in terms of the variable $f_{ab}^{(i,j)}$ is given by $$\sum_{i,j} \sum_k f_{ik}^{(i,j)}. \tag{2}$$

The quantity $\max_{(c,d) \neq (i,j)} \{f_{ij}^{(c,d)}\}$ represents the amount of capacity that link (i,j) needs to reserve so that it can carry the re-routed traffic from any link failure other than link (i,j). Thus $r_{ij} = \max_{(c,d) \neq (i,j)} \{f_{ij}^{(c,d)}\}$ and it is possible to rewrite inequality (1) as $$\sum_k f_{ik}^{(i,j)} + \max_{(c,d) \neq (i,j)} \{f_{ij}^{(c,d)}\} \leq C_{ij}, \quad i,j=1,2,\ldots,N. \tag{3}$$

This is a non-linear inequality. However, it is possible to make the inequality linear by using the following system of constraints $$\sum_k f_{ik}^{(i,j)} + f_{ij}^{(c,d)} \leq C_{ij}, \tag{4}$$

$c, d = 1, 2, \ldots, N$ and $(c,d) \neq (i,j)$.

When link (i,j) fails, the amount of re-routed traffic leaving node i must be the same as that entering node j. Therefore, $$\sum_k f_{ik}^{(i,j)} = \sum_k f_{kj}^{(i,j)}, \tag{5}$$

$i,j = 1, 2, \ldots, N$.

The re-routed traffic must satisfy flow conservation, i.e., for any intermediate node a (a≠i,j), the amount of re-routed traffic from the failed link (i,j) entering node a must equal the amount of re-routed traffic leaving node a. This means that $$\sum_k f_{ak}^{(i,j)} = \sum_k f_{ka}^{(i,j)}, \tag{6}$$

$a \neq i, j$ and $i, j = 1, 2, \ldots, N$.

Finally, non-negativity constraints on the variables, are needed i.e., $$f_{ab}^{(i,j)} \geq 0, \quad i,j,a,b=1,2,\ldots,N. \tag{7}$$

Thus, equations (2) and (4) to (7) now constitute a valid linear program, whose solution will yield an optimum assignment of primary and reserved capacities for all links.

Even though this is a valid linear program, it is readily seen that the number of constraints in inequality (4) are of order $O(N^4)$ and in equations (5), (6) and (7) are $O(N^2)$, $O(N^3)$ and $O(N^4)$, respectively. Thus, the total number of constraints for equations (4) to (7) are of order $O(N^4)$, which makes this linear optimization problem computationally costly. As a result, a fast and efficient recursive algorithm was developed to find an (approximately) optimal solution to the capacity assignment problem.

The algorithm to find maximal network primary capacities and alternative routes for restoration under any single link failure assumes that the link capacities $C_{ij}$, i,j=1,2,, ..., N, are integer-valued. This is not a serious limitation for practical problems since it allows any rational number to be scaled to an integer by an appropriate change in the units of capacity.

Before describing the algorithm, it is necessary to describe an important procedure which is a part of the algorithm. This procedure is the solution of the maximal flow problem. This problem, which arises in many network contexts is usually solved by the Ford-Fulkerson algorithm which is described in the book "Introduction to Algorithms" by T. Cormen et al, The MIT Press, 1990. The problem is to find the maximal flow that can be obtained between the two specified nodes i and j when there are specified limitations on the capacity of each link. When the maximal flow between node i and node j, denoted by $\phi_{ij}$, is found, the solution to this problem also provides all the distinct routes, say $\{1, 2, \ldots, K_{ij}\}$, along with the corresponding flow amount $h_k^{(i,j)}$ for each route k, k=1,2, ..., $K_{ij}$. Thus we have a set of $K_{ij}$ distinct routes with flow $h_k^{(i,j)}$ which altogether carry the maximal flow $\phi_{ij}$ and these quantities satisfy:

$$h_1^{(i,j)} + h_2^{(i,j)} + \ldots + h_{K_{ij}}^{(i,j)} = \phi_{ij}. \tag{8}$$

The solution of this problem will be used later to find alternative routes.

Define a network $G_r$ with the same topology as G, i.e., $G_r = G = (V,E)$, but its link capacities are $r_{ij}$. The network $G_r$ is referred to as the reserved network to emphasize that only the reserved capacity is being used in this network. Let the network $G_r \backslash (i,j) = (V, E−(i,j))$, i.e., assume that the link (i,j) has failed. Let $g_{ab}^{(i,j)}$ denote the amount of flow on the link (a,b) when one solves the maximal flow problem on the network $G_r \backslash (i,j)$. Clearly, it is necessary to have $$g_{ab}^{(i,j)} \leq r_{ab}, \quad a,b=1,2,\ldots,N \text{ and } (a,b) \neq (i,j) \tag{9}$$

since the amount of re-routed traffic on (a,b) due to the failure of (i,j) must not exceed the reserved capacity of (a,b). Also, since the entire primary traffic $\phi_{ij}$ is to be carried by the links emanating from i after the failure, we must additionally satisfy $$\phi_{ij} = \sum_k g_{ik}^{(i,j)}. \qquad (10)$$

Thus, given a reserved network $G_r$, $\phi_{ij}$ in equation (10) is the maximal amount of traffic that link (i,j) could carry in network G, which can be successfully re-routed through $G_r \backslash (i,j)$ when link (i,j) fails. It would be desirable to have $\phi_{ij}$ equal $p_{ij}$. The sum of $p_{ij}$ and $r_{ij}$ must remain below $C_{ij}$, which is equation (1). In order to fully utilize network resources, this summation should be as close to $C_{ij}$ as possible.

Figure 3A:
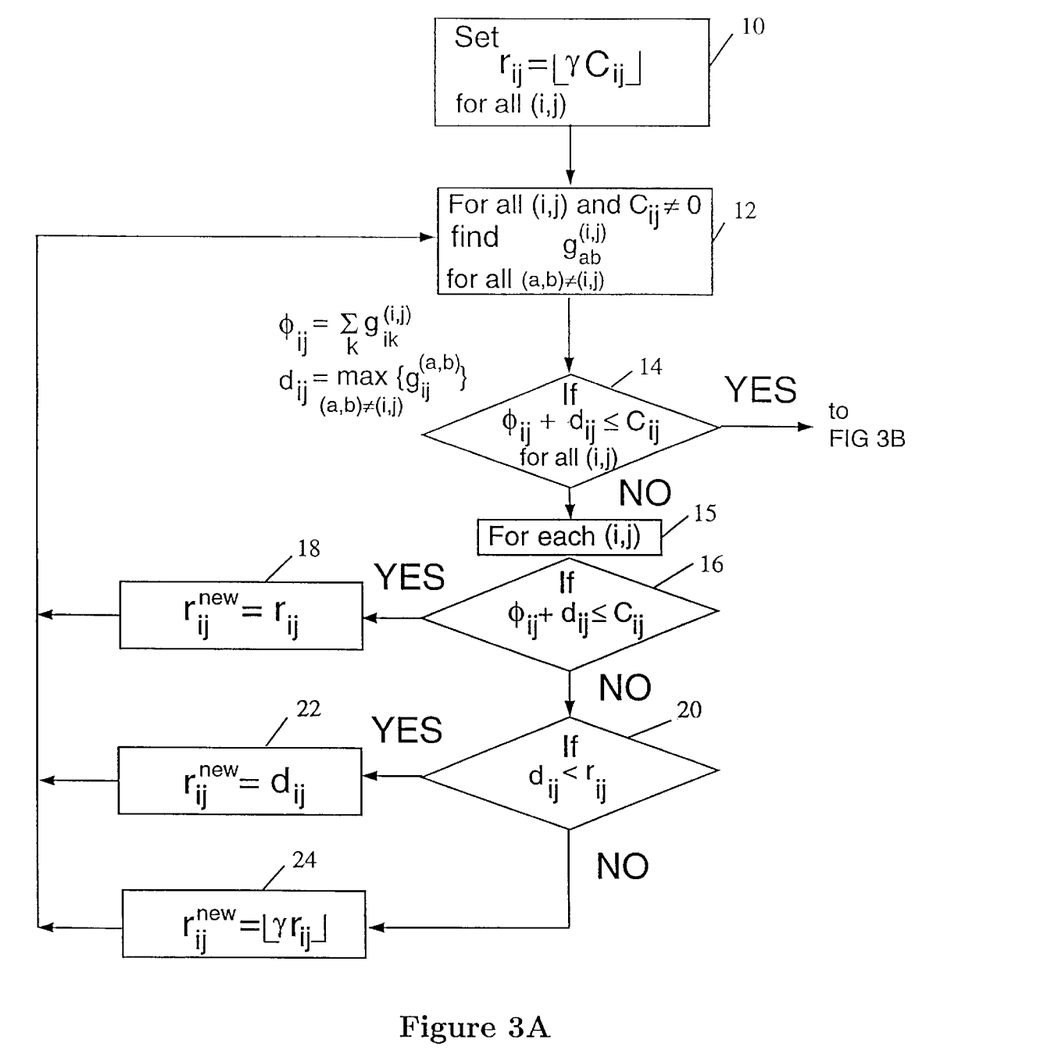
FIG. 3A is a flow diagram of a preferred algorithm for the global search portion of a preferred algorithm for practicing the present invention.
Figure 3B:
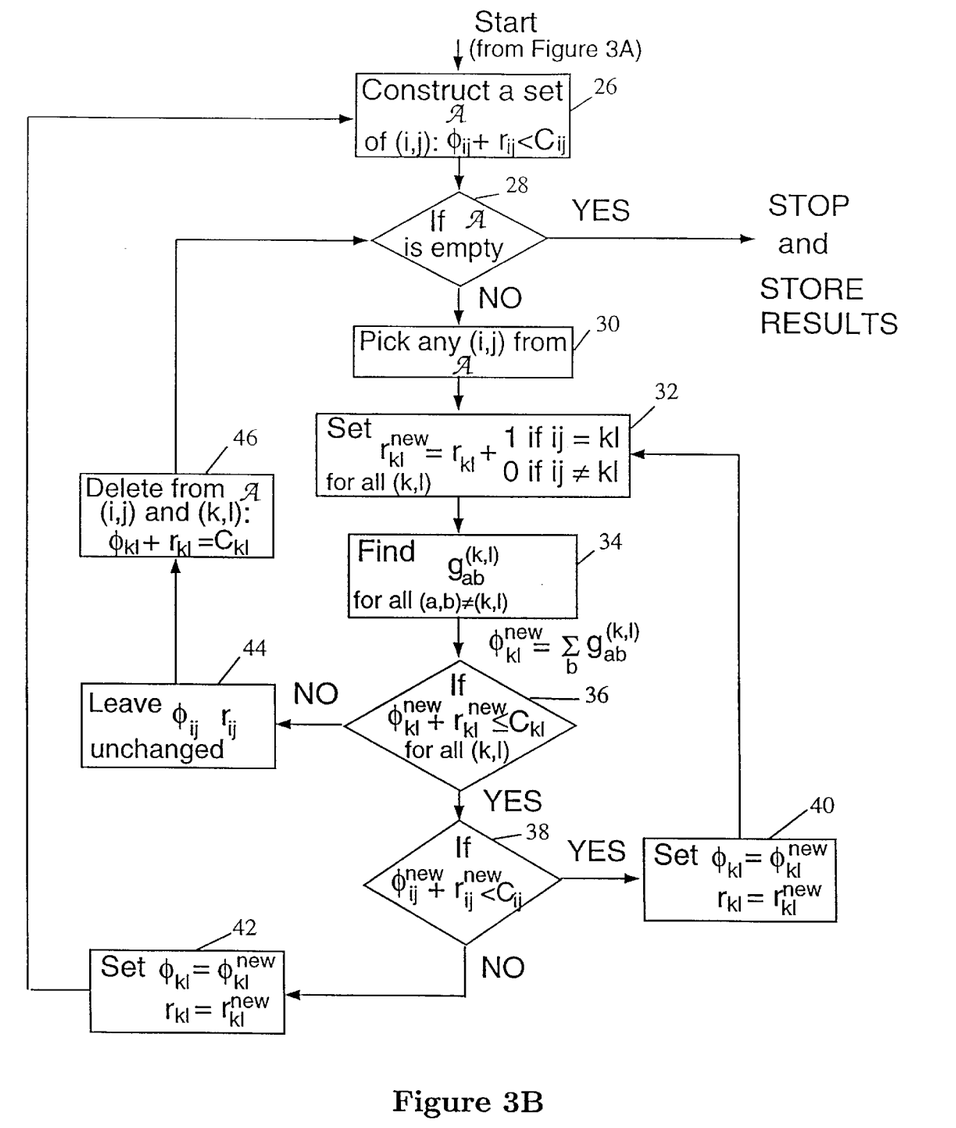
FIG. 3B is a flow diagram of a preferred algorithm of the perturbation refinement portion of a preferred algorithm for practicing the present invention.

The alternative routing algorithm forming a portion of the present invention comprises two parts. The first part is a global search to find the estimates of optimal $p_{ij}$, which are usually pessimistic, i.e., too low. The solution is then improved from the global search in a second part by using perturbation refinement. A flow diagram of the global search portion of the algorithm is shown in FIG. 3A. A flow diagram of the perturbation refinement portion of the algorithm is shown in FIG. 3B. The steps referred to in the following algorithm refer to the reference numerals in FIGS. 3A and 3B.

Algorithm

Part I: (Global Search)

Step 1: Initialization. Set $r_{ij} = \lfloor \gamma C_{ij} \rfloor$, i,j=1,2, ..., N, in the reserved network $G_r$. $\gamma$ is a pre-determined constant and $0 < \gamma < 1$. (Step 10)

Step 2: For all pairs (i,j), i,j=1,2, ..., N and $C_{ij} \neq 0$, solve the maximal flow problem using the Ford-Fulkerson algorithm to find out $\{g_{ab}^{(i,j)}\}$ (and thus $\phi_{ij}$) for a,b=1,2, ..., N and (a,b)≠(i,j). (Step 12)

Step 3: Check if, for all (i,j), i,j=1,2, ..., N, $$\sum_k g_{ik}^{(i,j)} + \max_{(a,b)\neq(i,j)} \{g_{ij}^{(a,b)}\} \leq C_{ij}. \text{ (Step 14)} \qquad (11)$$

If equation (1) is true, store $\phi_{ij}$ and $r_{ij}$; go to Part II of the algorithm.

If equation (11) is false, construct a new reserved network $G_r$ by the following:

$$r_{ij}^{new} = \begin{cases} r_{ij}, & \text{if equation (11) is true for } (i,j); \text{ (Steps 15, 16 and 18)} \\ \max_{(a,b)\neq(i,j)}\{g_{ij}^{(a,b)}\}, & \text{if equation (11) is false} \\ & \text{and } \max_{(a,b)\neq(i,j)}\{g_{ij}^{(a,b)}\} < r_{ij}; \text{ (Steps 20 and 22)} \\ \lfloor \gamma r_{ij} \rfloor, & \text{otherwise (Step 24)} \end{cases} \qquad (12)$$

Then go to Step 2.

Part II: (Perturbation Refinement)

Step 1: Construct a set of pairs (i,j) for which $\phi_{ij}+r_{ij}<C_{ij}$. Call this set A (Step 26).

Step 2: If the set A is empty, stop and store the final results (Step 28); otherwise pick any pair (i,j) from the set A and continue (Step 30).

Step 3: Set $r_{ij}^{new}=r_{ij}+1$; set $r_{kl}^{new}=r_{kl}$ for k, l=1,2, ..., N and (k,l)≠(i,j) (Step 32). Construct a new reserved network $G_r^{new}$ by $r_{kl}^{new}$, k,l=1,2, ..., N. For all pairs (k,l), k,l=1,2, ..., N and $C_{kl}\neq 0$, solve the maximal flow problem using the Ford-Fulkerson algorithm to find out $\{g_{ab}^{(k,l)}\}$ (and thus $\phi_{kl}$) for a,b=1,2, ... N and (a,b)≠(k,l) (Step 34).

Step 4: Check if, for all (k,l), k,l=1,2, ..., N, $$\phi_{kl}^{new}+r_{kl}^{new}\leq C_{kl} \text{ (Step 36)}. \qquad (13)$$

If equation (13) is true, the algorithm proceeds with
  if $\phi_{ij}^{new}+r_{ij}^{new}<C_{ij}$, set $\phi_{kl}=\phi_{kl}^{new}$ and $r_{kl}=r_{kl}^{new}$, k,l=1,2, ..., N; go to Step 3 in Part II (Steps 38 and 40).
  if $\phi_{ij}^{new}+r_{ij}^{new}=C_{ij}$, set $\phi_{kl}=\phi_{kl}^{new}$ and $r_{kl}=r_{kl}^{new}$, k,l=1,2, ..., N. Go to Step 1 in Part II (Steps 38 and 42).

If equation (13) is false, $\phi_{ij}$ and $r_{ij}$ are left unchanged (Step 44). Delete the pair (i,j) and all pairs (k,l) from set A, satisfying $\phi_{kl}+r_{kl}=C_{kl}$, (k,l) ∈ A and (k,l)≠(i,j) (Step 46); Go to Step 2 in Part II.

In part I (global search) of the algorithm, the reserved capacities are initially made high (i.e., $\gamma$ is close to 1, say 0.9) so that inequality (11) (or, equivalently constraint (3)) is violated for most pairs (i,j). Then the algorithm iteratively reduces the network's reserved capacities according to Step 3 until inequality (11) holds for all pairs of (i,j). Note that by reducing the reserved capacities of the network, the potential maximal primary capacity will decrease as well (since the primary and reserved capacities satisfy inequality (10)). After each iteration, both the primary and reserved capacities (on the left hand side of inequality (1)) decrease. By the monotone convergence theorem, this guarantees that part I of the algorithm terminates. When part I of the algorithm terminates, a solution is found for the primary and reserved capacity assignment for the network which satisfies inequality (1). The solution may not be optimal because a larger overall primary capacity may be achieved by adjusting some of the reserved capacities.

In part II (perturbation refinement) of the algorithm, the solution from part I is improved in a way such that for each pair of (i,j), there is a gradual increase in reserved capacities without violating inequality (11). Thus, the overall primary capacities increases as well due to the fact that that the primary and reserved capacities satisfy equation (10). The net effect is that in part II of the algorithm, every iteration causes an improvement of the objective function and again the monotone convergence theorem guarantees that the algorithm will terminate. This procedure repeats until every pair of (i,j) has been checked.

When the algorithm terminates, the result is a static capacity assignment for the network and a potential set of alternative routes for each link: For each network link (i,j), there is found the primary capacity $p_{ij}$ and reserved capacity $r_{ij}$, i,j=1,2, ..., N. As described above, for each link (i,j), the algorithm obtains all of its distinct alternative routes $\{1,2, \ldots, K_{ij}\}$ with capacity $h_k^{(i,j)}$ for each alternative route k. Thus the capacities of the alternative routes for link (i,j) can be represented by a $K_{ij}$-dimensional vector $(h_1^{(i,j)}, h_2^{(i,j)}, \ldots, h_{K_{ij}}^{(i,j)})$ and the use of the Ford-Fulkerson algorithm ensures that $$h_1^{(i,j)}+h_2^{(i,j)}+ \ldots, +h_{K_{ij}}^{(i,j)}=p_{ij}. \qquad (14)$$

Nodes i and j store the $K_{ij}$ alternative routes and their capacity vector $(h_1^{(i,j)}, h_2^{(i,j)}, \ldots, h_{K_{ij}}^{(i,j)})$ in its routing tables. At the time of call admission, link (i,j) can admit up to $p_{ij}$ amount of primary traffic and this is the initial call admission criterion used by the link for accepting or rejecting a call that needs to be setup. In addition, if the call can be admitted initially, node i must also set up the alternative route, in the event that link (i,j) fails. This implies that from the potential set of alternative routes, node i chooses one which has sufficient capacity to carry this call. If such an alternative route can be found, the call is finally accepted along the link (i,j). Note that for each call, only one alternative route can be used, (the call cannot be split into multiple alternative routes) otherwise the cells belonging to this call would have to be resequenced at the destination. The details of how some of these are to accomplished are discussed below.

The algorithm can be modified to address two additional issues. One issue is to limit the number of hops to a predetermined value to prevent the overall delays from becoming excessive. The other issue is to avoid wasteful loops in the alternative routes.

With regard to hop-limited routing, it should be noted that it may be desirable to modify the algorithm so that the number of hops in any alternative route for link (i,j) is not more than a predetermined value $m_{ij}$. Define a sub-network of the reserved network $G_r$, denoted by $G_r^{m_{ij}}$, which only includes those nodes and links such that no route between nodes i,j traverses more than $m_{ij}$ hops. The algorithm then finds the maximal flow between link (i,j) on $G_r^{m_{ij}}\backslash(i,j)$ instead of $G_r\backslash(i,j)$. The actual task of determining this sub-network can be carried out by examining a tree which is rooted at node i and whose depth could be up to $m_{ij}$. The children of any node k in this tree are the nodes which can be reached in 1 hop from node k. No further expansion is performed if any leaf of this tree happens to be node j. Finally, after obtaining the tree to a depth of $m_{ij}$, all branches and leaves which do not contain the node j are pruned. The remaining sub-tree is now the network $G_r^{m_{ij}}\backslash(i,j)$. Note that the alternative routing algorithm itself does not increase in complexity, since the construction of this tree has to be done only when topological changes are made in the network (addition or deletion of nodes and/or links).

The alternative routes provided by the algorithm will not create any loops that cause deadlocks. So its deleterious effect is only limited to lowering the potential utilization when failure does occur. Even so, the following procedure could be adopted to alleviate the effect of this kind of loop by disseminating the information about each call's primary route to each node along this route.

The source node selects an initial primary route and sends a probe packet along the route. This probe packet contains the information about the selected primary route. Assume that the selected primary route uses the link (i,j). When this probe packet reaches node i, this node is required to do two things. The first is to determine if the call can be admitted along the link (i,j) of the primary route. The second is to determine an alternative route to the link (i,j), in the event of a failure of this link. Since node i has complete information about the selected primary route, it is now an easy matter for it to select an alternative route which avoids any of the nodes in the selected primary route. This simple device will avoid wasteful loops.

The following description provides details regarding the determination of an alternative route for a call during call setup. Assume that each node has a call setup module that performs this task.

Assume that the algorithm described above has been executed when the last topological or capacity change was made. For any link (i,j), the set of potential alternative routes $\{1,2,\ldots,K_{ij}\}$ is known as is the capacities available on each of these routes. Further assume that the call setup module is implemented in node i and the link to be used by the primary route is (i,j). The call setup module performs the following steps:

1. A request to connect the call arrives into the call setup module of the node.

2. The request contains information such as the selected primary route to the destination (list of nodes in a particular sequence), bandwidth requirement (assumed to be B Mbps), whether or not the alternative routing is requested for this call and any constraints on the alternative route (e.g., hop count and/or loop avoidance).

3. For port j, the node will then provide a list of alternative routes $\{1,2,\ldots,K_{ij}\}$ and the amount of reserved bandwidth available on each route for re-routing. This is shown schematically in Table 1. The static allocation bandwidth is the original bandwidth ($h_1^{(i,j)}, h_2^{(i,j)}, \ldots, h_{K_{ij}}^{(i,j)}$) that was allocated by the algorithm for the alternative routes for the link (i,j) and the current available bandwidth ($\hat{h}_1^{(i,j)}, \hat{h}_2^{(i,j)}, \ldots, \hat{h}_{K_{ij}}^{(i,j)}$) is the bandwidth available after subtracting the portion used by the currently on-going calls using the link (i,j).

TABLE 1

| Output Port # | Static Allocation Bandwidth | Current Available Bandwidth | Path |
|---|---|---|---|
| j | $h_1^{(i,j)}$ | $\hat{h}_1^{(i,j)}$ | x → y → j |
| j | $h_2^{(i,j)}$ | $\hat{h}_2^{(i,j)}$ | u → v → j |
| • | • | • | • |
| • | • | • | • |

4. The call setup module then decides on an alternative route for the given call. The criteria for choosing the alternative are:

(a) Satisfy the hop-count requirement (if required): choose the set of alternative routes that satisfy the hop-count requirement.

(b) Satisfy the loop-free criteria (if required): avoid alternative routes that will cause loops.

(c) Satisfy the bandwidth criteria: from the list of chosen alternative routes, choose the one that has the smallest current available bandwidth in excess of B. The rationale for choosing the smallest current available bandwidth is to leave larger bundles of bandwidth untouched for future calls that may need larger bandwidth.

5. Once the outgoing primary and the alternative ports have been chosen, the call setup module marks the primary and alternative ports for each call or virtual circuit in the VC Table entry with the appropriate bandwidth calculations. So, if an outgoing link fails for a given VC, the node uses the alternative outgoing port as specified in the VC Table.

6. The node also sets up the alternative route to node j at the time of call setup. This involves sending a secondary setup packet, originating at node i and terminating at node j, using the alternative route just selected. The act of setting up this alternative route at the time of call setup has the advantage of causing practically no disruption when failure does occur. On the other hand, this involves an additional processing overhead at call setup.

7. When a failed link is restored, all traffic is sent back to the primary outgoing port as was originally intended. In the actual implementation, the choice between a primary and its alternative outgoing port is made on a cell by cell basis, i.e., for each cell on a given VC, the node will route to the primary outgoing port as long as the corresponding link is not faulty, otherwise it will route to the alternative outgoing port.

8. When this call is completed, the call setup module deletes the VC entry from the VC Table as well as release the bandwidth in both the primary and alternative routes to the routing table as well as to the alternative routing tables. In addition, the module has to initiate a call tear-down packet which traverses along the selected alternative route from node i to node j.

The capacity assignment results from the static algorithm depend on two factors: network topology (V,E) and capacities $C_{ij}$. The following examples show some results performed for several networks.

Figure 4:
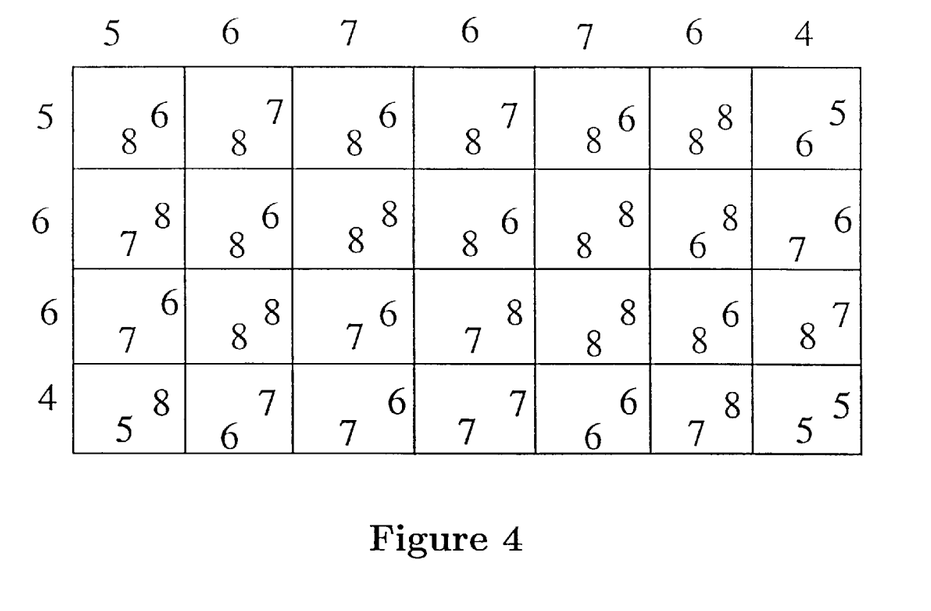
FIG. 4 is a graphical representation of a 40-node mesh network.

Consider a 40-node mesh network (arranged on a 5×8 grid) which has 67 links. Each link has a capacity of 10 units. The algorithm was applied to this network and the result is shown in FIG. 4. In FIG. 4, the primary capacity obtained by the algorithm for each link is shown. The overall primary capacity is 454 units (or 68%) out of a total of 670 units. This is to be contrasted to a link-based scheme of the same 40-node mesh network, for which a simulation study was conducted in Anderson et al, supra. The method used in Anderson et al allows 46.5% of the total capacity to be used for primary routes. Thus, the present method shows an improvement of about 46% in the overall primary capacity for this special network.

Figure 5:
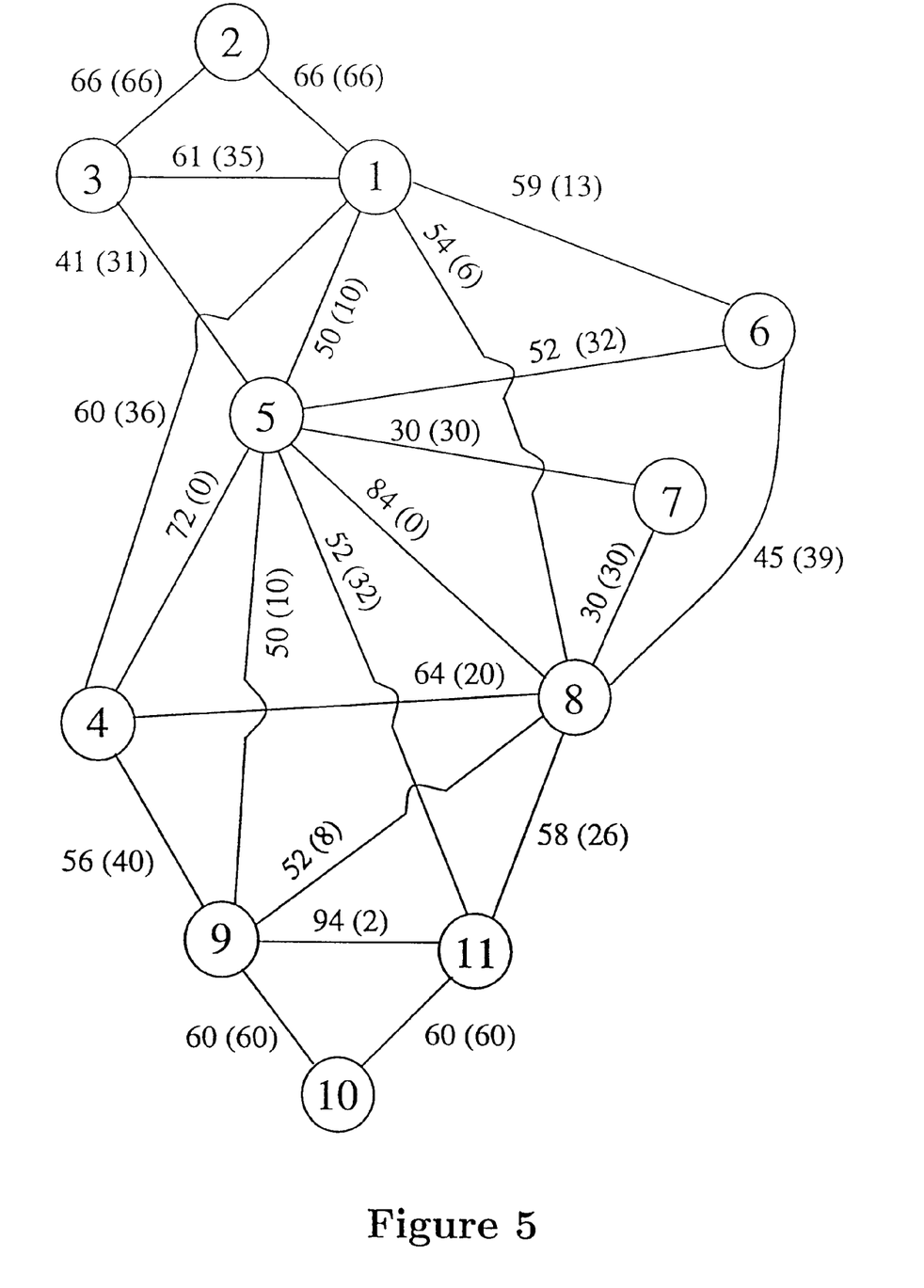
FIG. 5 is a graphical representation of an 11-node, 23-link local area network.

FIG. 5 shows a 11-node, 23 link local area network with 1968 unit total capacity. The numbers on each link indicate its primary and reserved (in parenthesis) capacities obtained using the present algorithm. The overall primary capacity is 1316 units (or 66.9%) out of a total of 1968 units. In Sakauchi et al, supra, 1252 units of overall primary capacity is achieved (note that their problem formulation is different).

Figure 6:
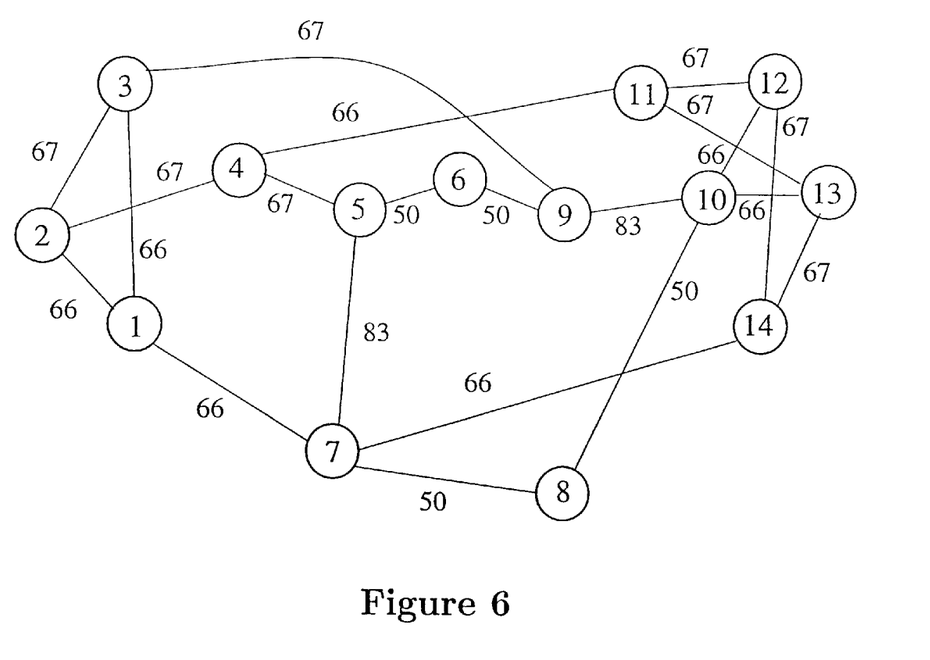
FIG. 6 is a graphical representation of a 14-node, 21-link sparse NSFnet.

FIG. 6 shows a 14-node, 21-link sparse NFSnet T1 network such as is described in an article by E. Spiegel et al, entitled "An Alternative Path Routing Scheme Supporting QOS and Fast Connection Setup in ATM Network," IEEE GLOBECOM '94, 1994 with a total capacity of 100 units for each link. For this network, applying the algorithm of the present invention results in a primary capacity of 1363 units (or 65%) out of a total of 2100 units.

To further test the performance of the present algorithm, two sets of random graphs were generated and the algorithm was applied in order to obtain a solution. The method of generating the graphs was as follows. The network contains N nodes, where N is a uniformly distributed random variable between 30 and 50. The construction of the network is done is stages. In stage k, the sub-network contains k nodes, i.e., in each stage, an extra node is added to a partially completed sub-network. When the (k+1)-st node is added, it is connected by L links to the nodes of the sub-network defined by the set $\{1, \ldots, k\}$, where L is uniformly distributed between min$\{a,k\}$ and min$\{b,k\}$. Note that these L links are connected to L nodes chosen randomly (without replacement) from the set $\{1, \ldots, k\}$. For these L links, the capacity is chosen uniformly between 50 and 150 units. In the first set of experiments, the selection of a=2 and b=5 and was made the experiment ran over 100 such random graphs. On the average, the overall primary capacity was 64.51% (with a standard deviation of 2.69%) of the total link capacity. The average run time on an SGI Challenge-L computer was about 4.5 minutes. In the second set of experiments, the selection of a=2 and b=3 was made and the experiment ran over 100 random graphs. On the average, the overall primary capacity was 60.1% (with a standard deviation of 2.86%) of the total link capacity. The average run time was about 3.3 minutes. These experiments reveal that the run time of the present algorithm is quite small and that the degree of connectivity (measured by the mean of L) plays a significant role in determining the ratio of primary capacity to the overall link capacity.

In conclusion, the present invention provides a link-based alternative routing scheme to restore a network undergoing any single link failure. A fast algorithm is described which results in a near optimal primary and reserved capacity assignment for the overall network resources (i.e., link capacities). The alternative route information is stored locally and the decision about the actual alternative routes for specific calls is done in a distributed manner. The main advantage of the invention is that VCs can be switched along the alternative routes immediately on detection of failure, resulting in minimum disruption and overheads. The scheme can be modified to accommodate hop-count limitations and loop avoidance.

While there has been described and illustrated a preferred embodiment of the present invention as well as variations and modifications thereof, it will be apparent to those skilled in the art that further variations and modifications are possible without deviating from the broad spirit and principles of the present invention which shall be limited solely by the scope of the claims appended hereto.

What is claimed is:

1. A method of optimally dividing the available bandwidth of a network, having an arbitrary set of nodes, links and link capacities, and that has been logically partitioned into primary and secondary networks such that the primary network carries main network traffic and the secondary network carries traffic resulting from rerouting of calls due to the link failure, to establish alternative routes at call setup for network restoration after a link failure, comprising the steps of:

(a) determining an initial primary network link capacity assignment and an initial secondary network link capacity assignment based on a global search algorithm; and (b) maximizing the primary network link capacity assignment by refining the initial primary network link capacity assignment and initial secondary network link capacity assignment obtained in step (a) based on a perturbation refinement algorithm, wherein the secondary network link capacity assignment remains sufficient to reroute calls in the event of a link failure.

* * * * *